Oct. 23, 1928.
S. C. HIGHERS
END GATE FASTENER
Filed March 13, 1928
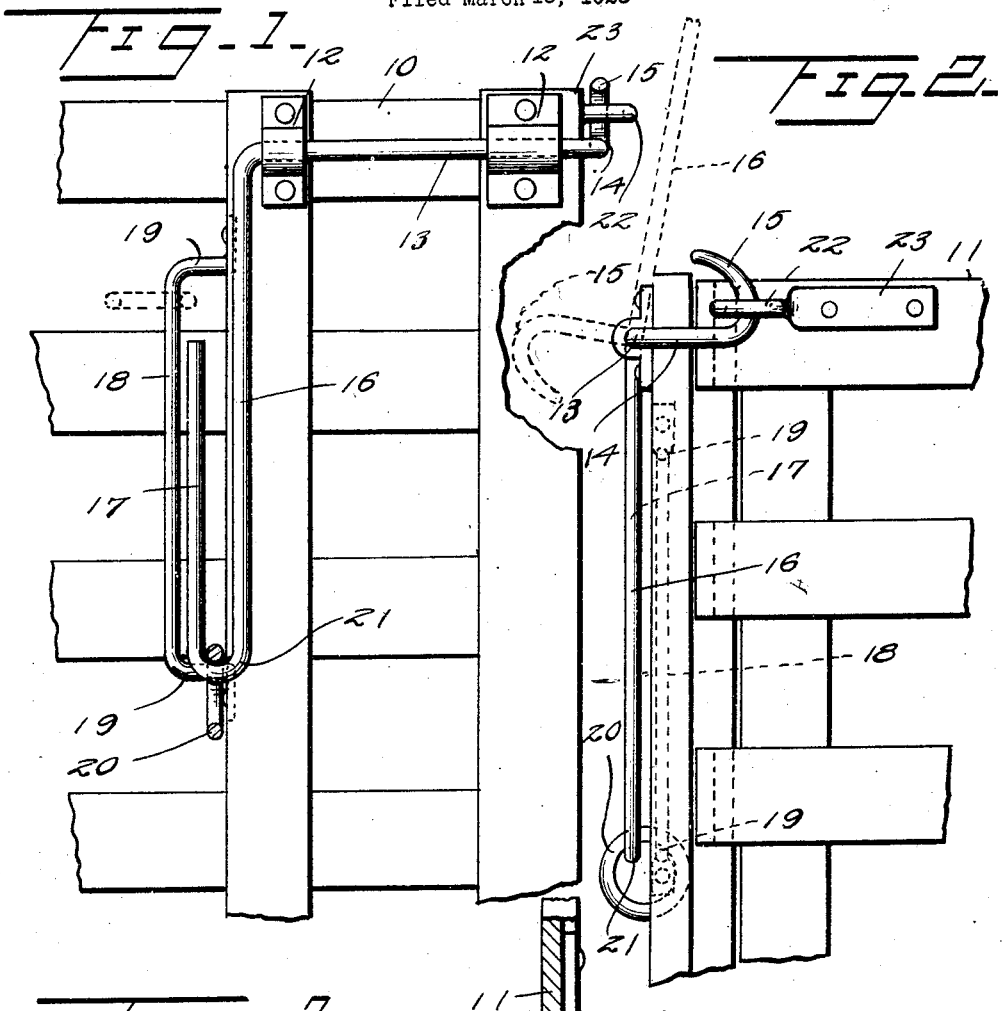
Inventor
S. C. Highers
By Watson E. Coleman
Attorney Patented Oct. 23, 1928.

1,688,543

UNITED STATES PATENT OFFICE.

SIMON C. HIGHERS, OF DIXON SPRINGS, TENNESSEE.

END-GATE FASTENER.

Application filed March 13, 1928. Serial No. 261,291.

This invention relates to end gate fasteners and more particularly to a fastener for the removable end gates of stake wagons or trucks.

An important object of the invention is to provide a fastener which may be readily installed and operated and which will be substantially automatic in its operation of retaining the gate in secured position.

A further object of the invention is to provide a novel and improved latching mechanism for the fastener which is of such character that it cannot be readily displaced by jolting or jarring of the vehicle and which, at the same time, may be engaged and disengaged with a minimum of effort.

These and other objects I attain by the construction shown in the accompanying drawing, wherein for the purpose of illustration is shown a preferred embodiment of my invention, and wherein:—

Figure 1 is a side elevation showing an end gate fastener constructed in accordance with my invention applied to a vehicle body;

Figure 2 is an end elevation thereof;

Figure 3 is a plan view thereof.

Referring now more particularly to the drawings, the numeral 10 generally designates the side member of a stake wagon and 11 the end gate thereof. In accordance with by invention, I secure to the side member brackets 12 in which I pivot a rod 13. The rear end of this rod, which extends to the rear end of the side member, has a right angularly extending arm 14 formed to provide an open hook 15, which preferably tapers from its bill to the point of its connection to the arm. The opposite end of the rod is provided with an angular arm 16 having at its free end a reverted portion 17, which is in spaced relation to the arm. Secured to the side member 10 is a vertically extending guide 18 paralleling the arm and having at its ends angular portions 19 forming feet which are attached to the side member. Slidable upon this guide is a ring 20, which may be slipped over the upper end of the reverted portion 17. The connection 21 of this reverted portion with the arm 16, when this arm is depending, aligns with the lower angular portion 19 of the guide, so that the ring may be simultaneously supported by this connection and the angular portion. The angular portion is of such width as to prevent the ring from moving upwardly upon the guide and reverted portion when it is horizontally disposed and, therefore, this ring may not be displaced by jolting or jarring of the vehicle.

To the tail gate, I secure an eye 22 for engagement by the hook 15. This eye is preferably formed upon one end of a strap 23 secured to the tail gate and is so positioned that it may be freed from the hook only by arranging the arm 16 in a vertical position in which the arm extends upwardly from the rod 13. Therefore, in order to disengage the hook 15 from this eye, it is necessary not only that the ring 20 be disengaged but that the arm 16 rotate against the action of gravity through 180°. The total impossibility of such an action will be readily appreciated, particularly when consideration is given to the fact that frictional resistance will add to the difficulty of such an operation.

It will be obvious, however, that the tail gate may be readily disengaged at any time that this is desired. The hook 15 will effectually prevent movement of the tail gate either longitudinally of the vehicle or vertically with relation thereto.

Since the construction is capable of a certain range of change and modification without materially departing from the spirit of the invention, I do not limit myself to such specific structure except as hereinafter claimed.

I claim:—

1. In a securing means for the tail gates of stake wagons, a bar pivoted to the wagon side and having at its rear end a hook and at its forward end an angulr arm, the tail gate having an eye, the hook being positionable to receive the eye when the arm of the bar is vertically disposed and above the bar and being fully engaged therewith when the arm is vertically disposed and below the eye.

2. In a securing means for the tail gates of stake wagons, a bar pivoted to the wagon side and having at its rear end a hook and at its forward end an angular arm, the tail gate having an eye, the hook being positionable to receive the eye when the arm of the bar is vertically disposed and above the bar and being fully engaged therewith when the arm is vertically disposed and below the eye, a vertically extending guide carried by the wagon side and paralleling said arm, said arm having a reverted portion extending adjacent the body, and a ring carried by said guide and adapted for engagement over said reverted portion when the arm is in the last named position.

3. In a securing means for the tail gates of stake wagons, a bar pivoted to the wagonside and having at its rear end a hook and at its forward end an angular arm, the tail gate having an eye, the hook being positionable to receive the eye when the arm of the bar is vertically disposed and above the bar and being fully engaged therewith when the arm is vertically disposed and below the eye, a vertically extending guide carried by the wagon side and paralleling said arm, said arm having a reverted portion extending adjacent the body, and a ring carried by said guide and adapted for engagement over said reverted portion when the arm is in the last named position, said ring being engageable over said reverted portion when horizontally disposed.

In testimony whereof I hereunto affix my signature.

SIMON C. HIGHERS.